(12) United States Patent
Hodge (10) Patent No.: US 11,076,053 B2
(45) Date of Patent: *Jul. 27, 2021

(54) INTERMEDIARY SERVICE BUREAU SYSTEM AND METHOD

(71) Applicant: **GLOBAL TEL*LINK CORP.**, Reston, VA (US)

(72) Inventor: Stephen Lee Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/029,345

(22) Filed: Sep. 23, 2020

(65) Prior Publication Data

US 2021/0006663 A1 Jan. 7, 2021

Related U.S. Application Data (63) Continuation of application No. 15/286,264, filed on Oct. 5, 2016, now Pat. No. 10,848,624.

(51) Int. Cl.
*H04M 11/00* (2006.01)
*H04M 15/00* (2006.01)
*H04W 4/24* (2018.01)

(52) U.S. Cl.
CPC .......... *H04M 15/41* (2013.01); *H04M 15/49* (2013.01); *H04M 15/51* (2013.01); *H04M 15/805* (2013.01); *H04M 15/8044* (2013.01); *H04W 4/24* (2013.01)

(58) Field of Classification Search
None
See application file for complete search history.

(56) References Cited

U.S. PATENT DOCUMENTS

| | | |
|---|---|---|
| 7,069,227 B1 | 6/2006 | Lintel, III et al. |
| 7,529,357 B1 | 5/2009 | Rae et al. |
| 7,860,222 B1 | 12/2010 | Sidler |
| 8,761,353 B1 | 6/2014 | Apple et al. |
| 9,020,115 B2 | 4/2015 | Hangsleben |

(Continued)

OTHER PUBLICATIONS

International Search Report and Written Opinion directed to International Patent Application No. PCT/US2017/063960, dated Jan. 30, 2018; 13 pages.

(Continued)

*Primary Examiner* — Jinsong Hu
*Assistant Examiner* — Alexander J Yi
(74) *Attorney, Agent, or Firm* — Sterne, Kessler, Goldstein & Fox P.L.L.C.

(57) ABSTRACT

The present disclosure provides details on an intermediary service bureau (ISB) system which includes an ISB center that acts as an intermediary communication center between communication devices used by correctional facilities and contract providers. The ISB records communications, stores security data, and provides front end processing to facilitate an inmate to communicate with an outside party by way of a contract provider. Further, the ISB provides accounting services for inmates and friends and family that use services provided the contract provider. The contract provider provides security and routing services for the ISB by obtaining data from the ISB and updating data at the ISB according to the communications.

20 Claims, 6 Drawing Sheets

(56) References Cited

U.S. PATENT DOCUMENTS

| | | |
|---|---|---|
| 9,749,863 B2 | 8/2017 | Torgersrud |
| 2003/0126470 A1 | 7/2003 | Crites et al. |
| 2009/0017795 A1 | 1/2009 | Guichard et al. |
| 2010/0189228 A1 | 7/2010 | Seyfetdinov |
| 2011/0110507 A1* | 5/2011 | Spiegel ................. H04M 15/00 379/131 |
| 2013/0124645 A1 | 5/2013 | Thomas |
| 2014/0219432 A1 | 8/2014 | Bengston et al. |
| 2015/0215254 A1* | 7/2015 | Bennett ................. H04L 51/12 709/206 |
| 2017/0006494 A1 | 1/2017 | Wang |
| 2018/0097942 A1 | 4/2018 | Hodge |
| 2018/0158165 A1 | 6/2018 | Torgersrud et al. |

OTHER PUBLICATIONS

International Search Report and Written Opinion directed to International Patent Application No. PCT/US2017/054973, dated Dec. 18, 2017; 18 pages.

* cited by examiner

INTERMEDIARY SERVICE BUREAU SYSTEM AND METHOD

CROSS-REFERENCE TO RELATED APPLICATION

This application is a continuation application of U.S. application Ser. No. 15/286,264, filed Oct. 5, 2016, which is incorporated herein by reference in its entirety.

BACKGROUND

Field

The disclosure relates to a communication system that facilitates a centralized communication system competitively providing communication services to a jurisdiction.

Background

Inmate communication systems typically include a contract provider that provides communication security and routing services between a communication device at a correctional facility and a communication device outside of the correctional facility. Contract providers bid on contracts to provide the communication security and routing services to the correctional facility, and a winning contract provider provides these services for the correctional facility at the rate accepted during bidding. In turn, the contract provider obtains bids from service providers, such as AT&T or Verizon, to obtain low cost routing and termination services to the correctional facility. The bidding process used by both correctional facilities and contract providers allow communication rates to stay low for inmates and families and friends. However, the bidding process also means that when a contract has terminated, a new contract provider can take over the contract. The new contract provider may require a complete overhaul of equipment, software, accounts, and services provided which requires significant amounts of time and money for correctional facilities, inmates, and friends or families of the inmates.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Overview

Communication between inmates and outsiders has been shown to be an extremely important part of rehabilitation. Allowing for an inmate to keep in contact with friends and family significantly helps to reduce recidivism as well as to prepare an inmate for life after prison. Because most inmates are eventually released back into the public, any steps to minimize problems with their re-assimilation with society are highly beneficial.

To provide communications at a low cost, inmate communication systems typically include a contract provider that provides communication security and routing services between a communication device at a correctional facility and a communication device outside of the correctional facility. Contract providers bid on contracts to provide the communication security and routing services to the correctional facility, and a winning contract provider provides these services to the correctional facility at the rate accepted during bidding. In turn, the contract provider obtains bids from service providers, such as AT&T or Verizon, to obtain low cost routing and termination services to the correctional facility. The bidding process used by both correctional facilities and contract providers allow communication rates to stay low for correctional facilities.

However, some complications occur due to the transition from an old contract provider to a new contract provider. These complications, and the resulting problems, are shared by all parties involved in the communication system. As an example, an old contract provider is typically required to provide copies of recorded communications to a new contract provider but the copies are typically in a different format than the new format used by the new contract provider, resulting in all the copies being converted to a new format. As another example, a new contract provider typically uses different applications and accounts for the services provided which means that inmates and family/friends have to transition to new applications, which requires learning how to operate the new applications, and to switch accounts, which requires opening new accounts and requesting for refunds from the old contract provider.

In light of the above, the present disclosure provides details on an intermediary service bureau (ISB) system which includes an ISB center that acts as an intermediary communication center between communication devices used by correctional facilities and contract providers. The ISB records communications, stores security data, and provides front end processing to facilitate an inmate to communicate with an outside party by way of a contract provider. Further, the ISB provides accounting services for inmates and friends and family that use services provided the contract provider. The contract provider provides security and routing services for the ISB by obtaining data from the ISB and updating data at the ISB according to the communications.

Communication System

Figure 1:
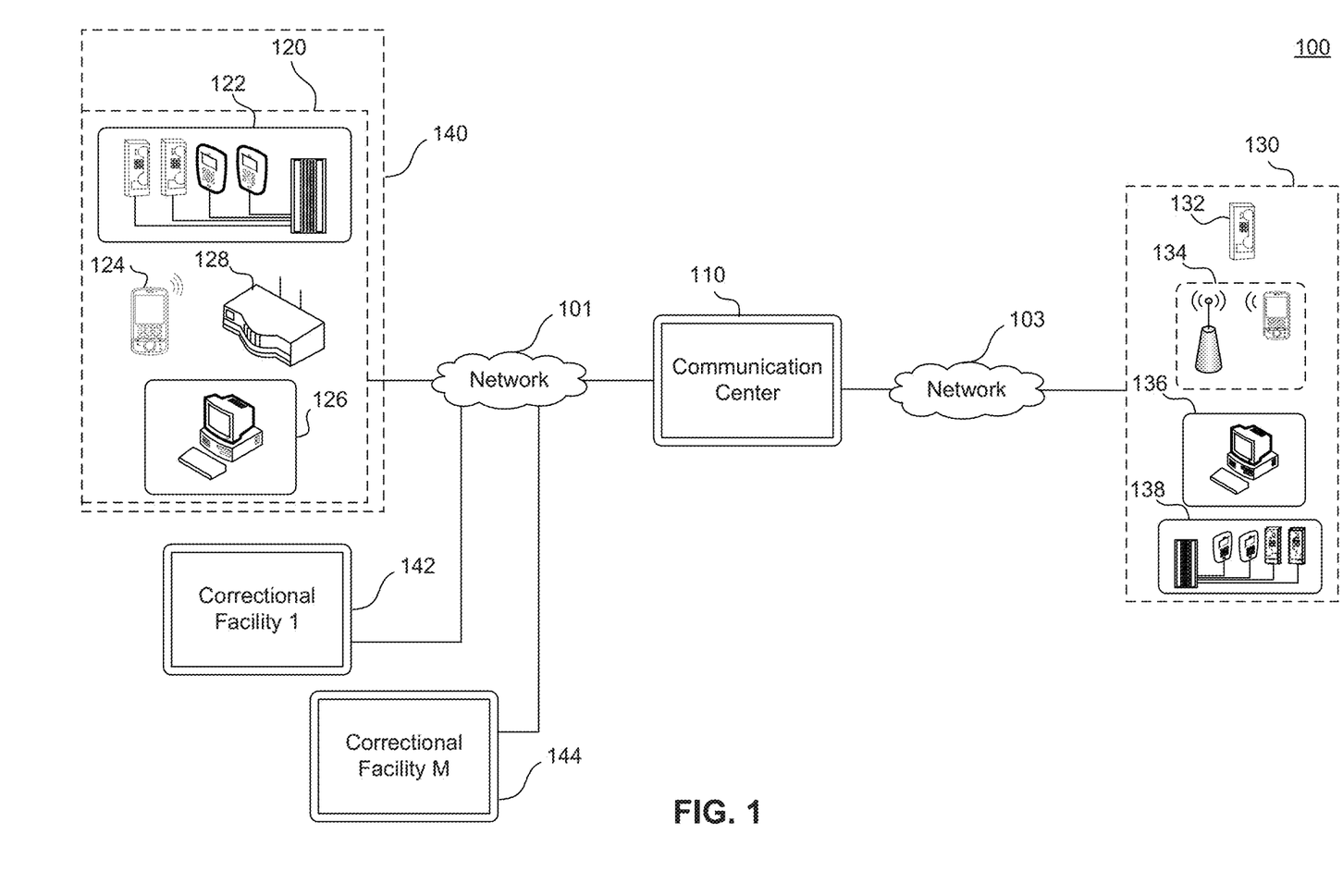
FIG. 1 illustrates a block diagram of an intermediary service bureau (ISB) system, according to exemplary embodiments of the present disclosure.

FIG. 1 illustrates a block diagram of a communication system 100, according to exemplary embodiments of the present disclosure. The communication system 100 includes a communication center 110 configured to communicate with a variety of devises over a variety of different communication networks. In particular, the communication center 110 is configured to route communications between an inmate communication device 120 and an outsider communication device 130, as will be described in further detail below.

The inmate communication device 120 includes any or all communication devices located at correctional facility 140 such as wired communication devices 122, which include audio and/or video communications devices, wireless communication device 124, and/or a control station 126. The inmate communication device 120 also includes a wireless access point 128 (e.g., a router), which may provide connectivity to the wireless devices 124. The inmate communication device 120 is configured to include one or more of a microphone and speaker for generating and receiving audio, a camera and a video screen for generating and viewing video, and/or a texting application such as an email client or a texting application. The inmate communication device 120 connects to the communication center 110 via a network 101. The network 101 includes a Local-Area Network (LAN), a Wide-Area Network (WAN), or the Internet, depending on the relative locations of the communication center 110 and the inmate communication device 120. For example, the communication center 110 may be located at a correctional facility where the inmate communication device 120 is located and therefore a LAN is used. In another example, the communication center 110 is located at a different location than the correctional facility and therefore the network 101 is a WAN or the Internet.

The outsider communication device 130 includes any and all devices such as a basic telephone 132, a wireless communication device 134, a work station 136, and/or wired communication devices 138, which include audio and/or video communications devices at another correctional facility. The outsider communication device 130 is configured to include one or more of a microphone and speaker for generating and receiving audio, a camera and a video screen for generating and viewing video, and/or a texting application such as an email client or a texting application. The outsider communication device 130 connects to the communication center 110 via network 103, which may include any or all of a WAN, the Internet, and/or a Public Switched Telephone Network (PSTN). In an embodiment, WebRTC may be utilized in place of a session initiation protocol (SIP) over a WAN or the Internet, each of which provides a dedicated, private link between the inmate communication device 120 and the outsider communication device 130. The WAN is used to provide access to control stations or clients such, as the work station 132, that are located within the WAN. The Internet is utilized to provide access to communication devices such as remotely distributed control stations (e.g., the work station 132). The PSTN can be used to provide connectivity to the basic telephone 134 and/or the wireless communication device 136 and other communication devices (not shown) over traditional data networks.

In an embodiment, the communication center 110 connects to multiple correctional facilities 140-144, as shown by FIG. 1. Correctional facilities 142-144 include communication devices similar to those described above for correctional facility 140. Each of the correctional facilities 140-144 can represent an individual correctional facility or a multiple facilities in a department of corrections.

Communication Center

Figure 2:
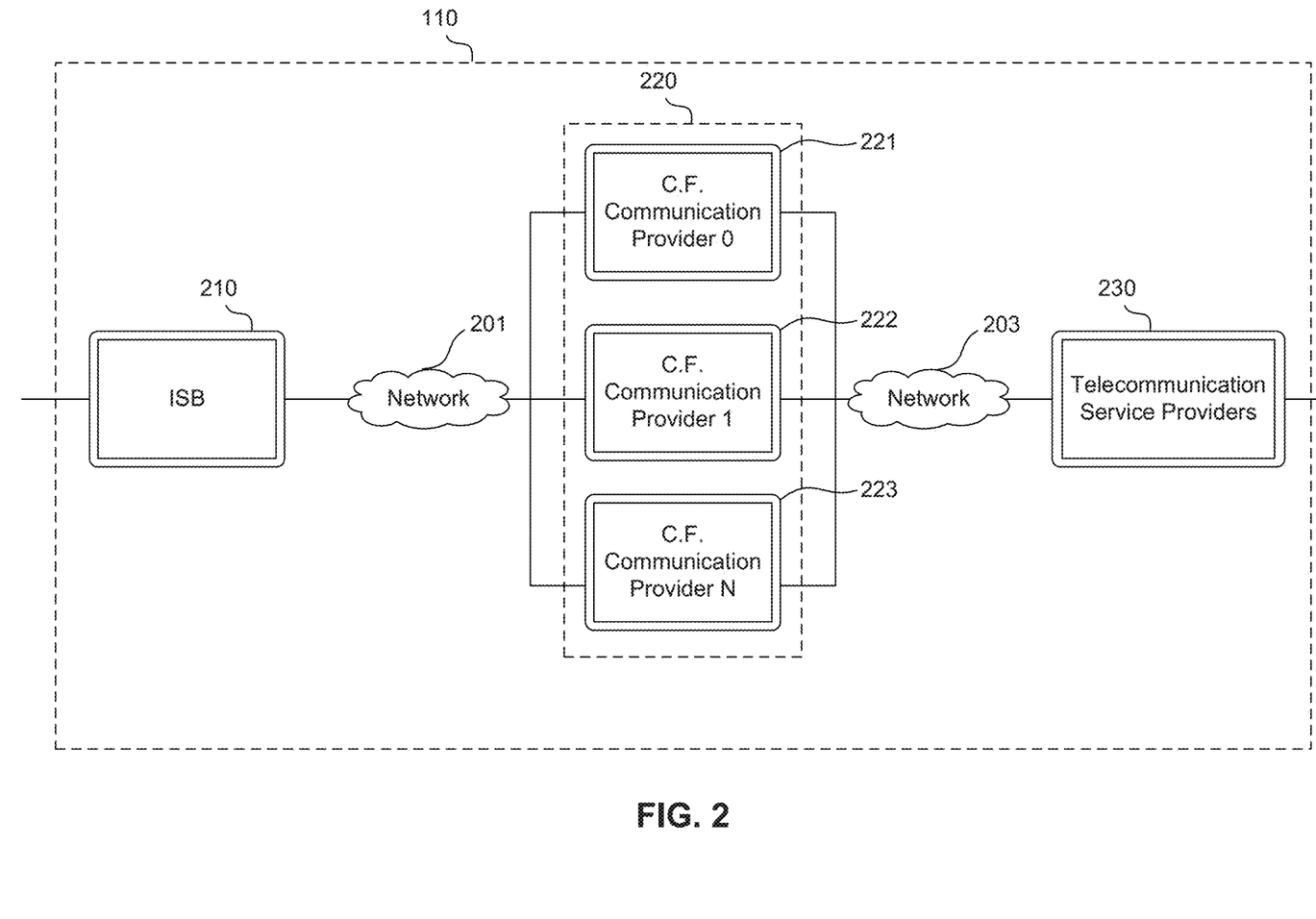
FIG. 2 illustrates a block diagram of a communication center, according to exemplary embodiments of the present disclosure.

FIG. 2 illustrates a block diagram of a communication center 110, according to exemplary embodiments of the present disclosure. The communication center 110 includes an intermediary service bureau (ISB) 210, a correctional facility communication provider 220, and a telecommunication service provider 230. The ISB 210 interfaces between an inmate communication device 120 at a correctional facility and correctional facility communication provider 220. In detail, all communications to or from the inmate communication device 120 are routed by way of the ISB 210 and the correctional facility communication provider 220. The ISB 210 connects the inmate communication devices to a corresponding correctional facility communication provider 220 based on stored data, explained in further detail below. Further, the ISB 210 facilitates storage of all communications and security data and provides permissions to correctional facility communication provider 220 to access and update the stored data. In providing storage of all communications and security data, the ISB 210 eliminates the complications caused by conventional communication contracts, as discussed above. Further, the ISB 210 provides a front end service for all the inmate communication device 120 interfaces such as a web interface or an interactive voice response (IVR), as will be explained in greater detail below. In providing the front-end service, the ISB 210 eliminates the complications that inmates and family/friends have in transitioning to new applications and accounting systems, as previously described. The ISB 210 connects to the correctional facility communication provider 220 by way of a network 201 which includes a Local-Area Network (LAN), a Wide-Area Network (WAN), or the Internet.

The correctional facility communication provider 220 includes any number of correctional facility communication providers 221-223. Correctional facility communication providers 221-223 may include providers such as Global Tel*Link™, Securus™, or Telmate™, that have contracted with a correctional facility to provide communication security, routing services, and monitoring services to the corresponding correctional facility. The correction facility communication provider 220 links a communication between and inmate and an outsider by way of the telecommunication service providers 230. The correction facility communication provider 220 connects to the telecommunication service provider 230 by way of a network 203, which includes a Wide-Area Network (WAN) or the Internet.

The telecommunication service providers 230 may include carriers that actually own phone carrier equipment (e.g., AT&T or Verizon) and/or wholesalers that have purchased an amount of session minutes for resale from the actual carriers. Further, the carriers 220 may include any or all types of communication carriers such as physical telephone line providers, voice over internet protocol (VoIP) providers, wireless providers, session internet protocol (SIP) providers, and/or video communication providers.

Intermediary Service Bureau Center

Figure 3:
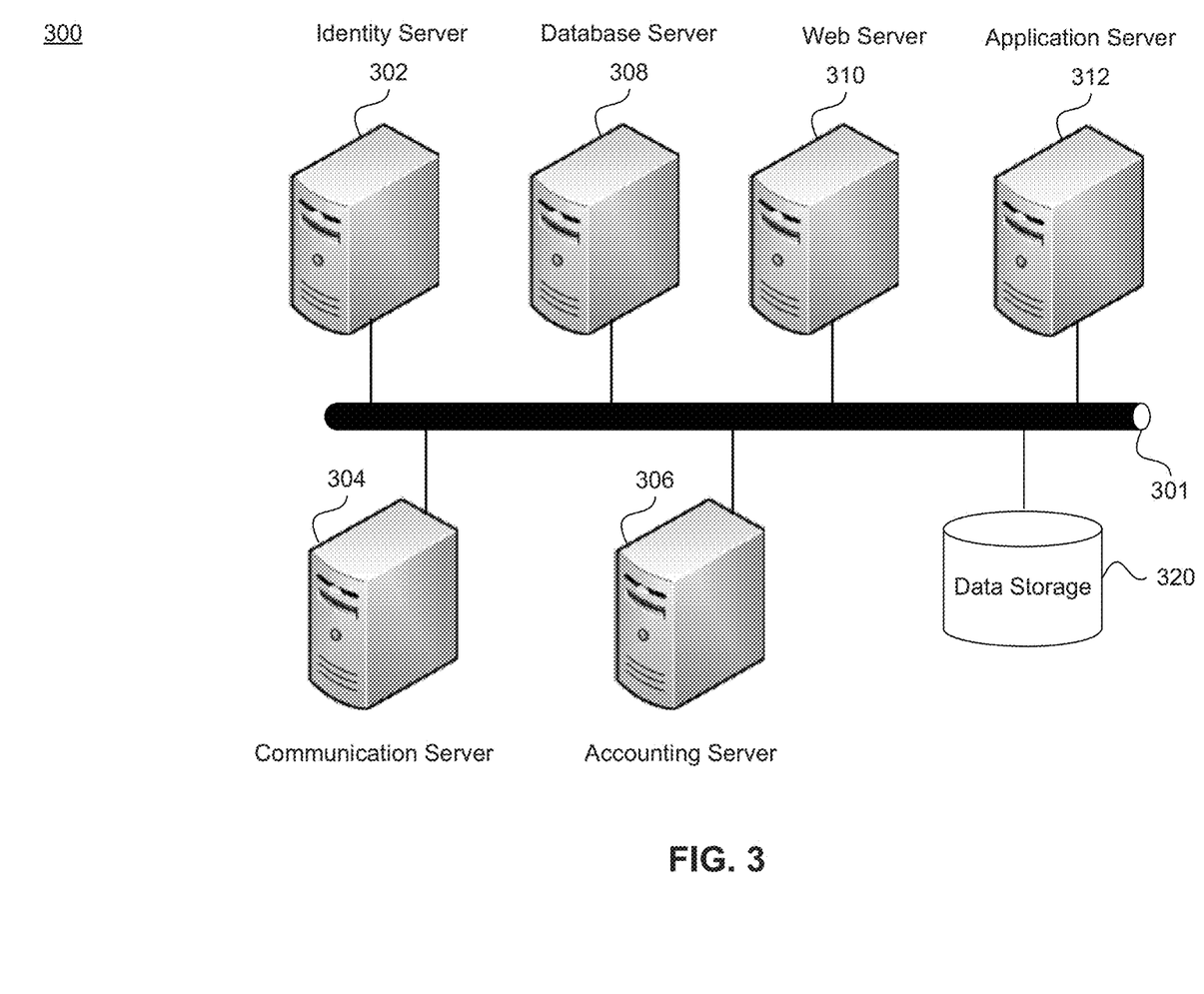
FIG. 3 illustrates a block diagram of an ISB center, according to exemplary embodiments of the present disclosure.

FIG. 3 illustrates a block diagram of a ISB center, according to exemplary embodiments of the present disclosure. The ISB center 300 may be an exemplary embodiment of the ISB center 210 of FIG. 2. The ISB center 300 includes an identity server 302, a communication server 304, an accounting server 306 a database server 308, a web server 310, an application server 312, and a data storage 320, that are all connected to each other via a network bus 201.

Each of the servers 302-312 can be constructed as individual physical hardware devices, or as virtual servers. The number of physical hardware machines can be scaled to match the number of simultaneous user connections desired to be supported in the ISB system 100.

The identity server 302 consists of any number of servers, and is configured to collect and store identity data of inmates and outsiders using the ISB system 100. Identity data includes at least one of username and password data, voice data, fingerprint data, retinal data, facial recognition data (2D or 3D), device data such as make and model of a communication device, and/or location data. The identity server 302 is further configured to assist in a secure communication between parties receiving/transmitting a communication. The identity server 302 assists by providing identity data to the correctional facility communication center 220 for identity verifications or performing identity verifications to authenticate identities of a purported parties based on a request from the correctional facility communication center 220. The identity verification includes logon verifications, such as username and password verifications, biometric verifications, such as voice recognition, fingerprint recognition, retinal recognition, facial recognition (2D or 3D), device verification, and/or location verification. An identity verification is performed by receiving identity information from a communication device (either 120 or 130) used by a purported party and comparing the identity information of the purported party with stored identity data.

The communication server 304 consists of any number of servers, and is configured to route communications and data to/from the inmate communication device 120. In doing so, the communication server 304 performs switching required to electrically transmit/receive communications. Further, the communication server 304 is also configured to store communications and data and/or transfer communications to another server. The communication server 304 stores the communications and data as files on an internal storage or an external storage, as will be explained in more detail below.

Because there may be a variety of different communication standards employed by different audio, video, image, and text devices used to communicate with the ISB center 110, in an embodiment, the communication server 304 is also configured to convert a format of the communications and data before storing related files. In an embodiment, the communication server 304 transfers communications to the correctional facility communication provider 220 to perform format conversion and then receives the converted communication and data files from the communication provider 220, as described below.

Further, because the communication server 304 receives and transmits communications and data by way of a network, in an exemplary embodiment, the communication server 304 can encrypt and decrypt communications and data, for security purposes.

The accounting server 306 consists of any number of servers, and is configured to collect, process, and stored accounting data for communications. In detail, the accounting server is configured to receive data from the correctional facility communication provider 220 regarding communication and those users having accounts and involved in the communications. The accounting server 306 performs payment and billing processing for users. Further, the accounting server 306 is configured to receive payments for the services used from users. By having the accounting server 306 perform all of the accounting services, instead of each correctional facility communication provider 221-223, users receive a single bill that is the same no matter the provider.

The database server 308 consists of any number of servers, and is configured to store and organize data in a relational database. The database server 308 is configured to run a database management system, such as MYSQL™, to provide an example. The database server 308 stores data related to the correctional facilities such as identifying information and corresponding jurisdictions of the correctional facilities and also stores data related to the plurality of correctional facility communication providers such as identifying information and corresponding jurisdictions having contracts with the correctional facility communication providers. The database server 308 further includes data on access permissions that each of the correctional facility communication providers have to data stored by the data storage 320.

The web server 310 consists of any number of servers, and is configured to run web server software such as Apache and/or Microsoft Internet Information Server and/or an interactive voice response (IVR) server software. The primary function of the web server 310 is to route requests and other communications from inmate communication device 120 or the outsider communication device 130 to an appropriate destination within the ISB system 100. In an embodiment, the web server 310 also serves as a maintenance point into the ISB center 110, by which servicing, configuring, and updating can be performed. In an embodiment, the web server 310 is connected to both the public Internet and the internal network of the facility. In an embodiment, the web server 310 can provide managing services for generating communications, receiving instructions from a party to send or receive communications, and coordinating the transmission of communications.

The data storage 320 provides access to a wide variety of data such as identity data, communication data including communications and communication logs, account data, and/or database data. In general, the data storage 320 stores any data stored by the identity server 302, the communication server 304, the accounting server 306, the database server 308, the web server 310, and the application server 312. Because the data stored on the data storage 320 may consume a significant amounts of storage space, the data storage 320 may include a Network Attached Storage (NAS) device, which is configured as a mass storage device. In order to reduce the required size of the data storage 320, the data storage 320 preferably includes a backup routine to transfer data to permanent storage devices, such as archival permanent storage or optical disks, after a predetermined time has elapsed since the initial recording of that data. The data storage 320 is connected to the servers 302-308 by way of the network bus 301.

Figure 4:
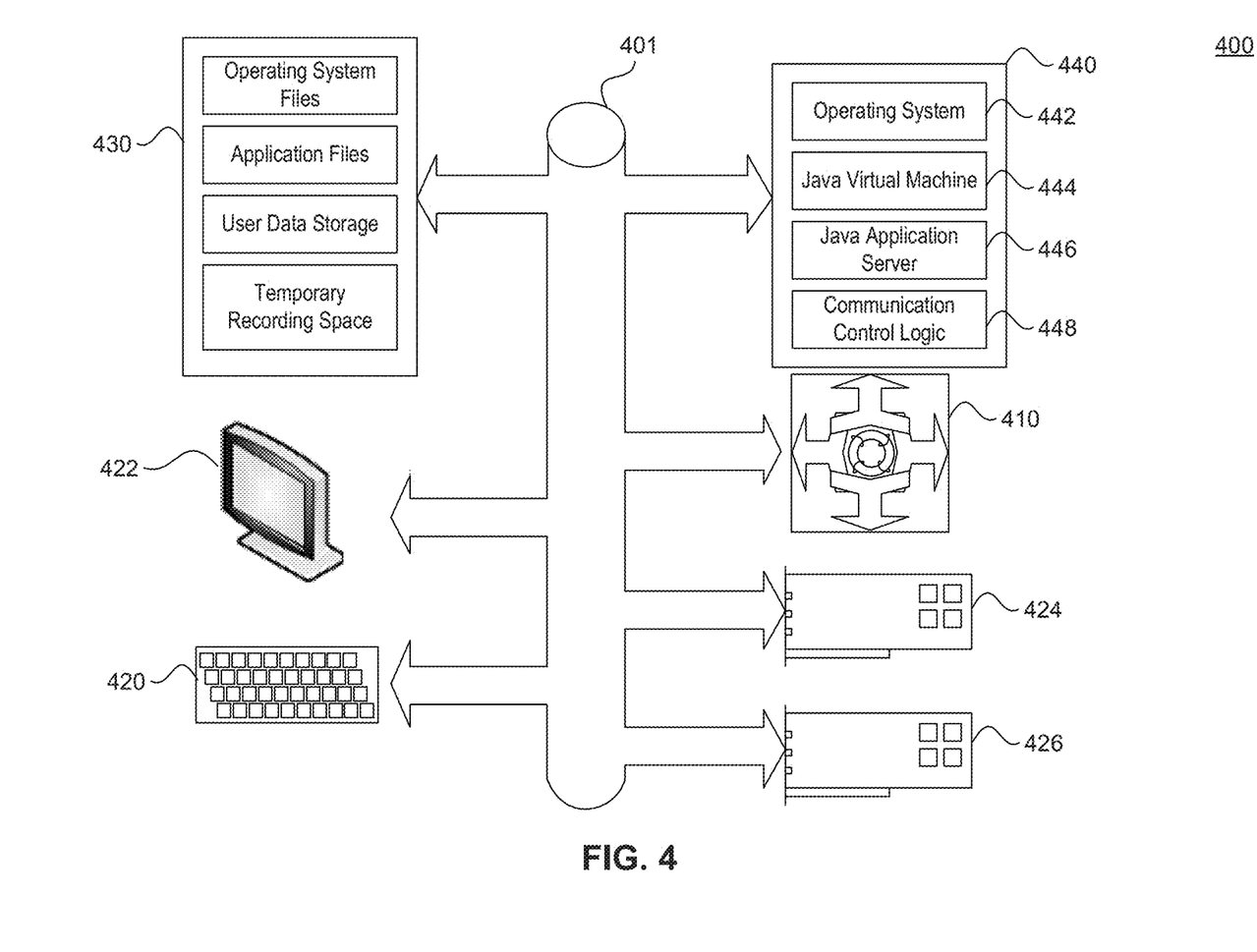
FIG. 4 illustrates a block diagram of an application server, according to exemplary embodiments of the present disclosure.

FIG. 4 illustrates an application server 400, according to exemplary embodiments of the present disclosure. The application server 400 may represent an exemplary embodiment of the application server 312 depicted in FIG. 3. The application server 400 consists of any number of servers, and functions as the primary logic processing center in the ISB system 100. The application server 400 is configured to manage and facilitate communication between the identity server 302, the communication server 304, the database server 308, the web server 310, and the data storage 320.

The application server 400 includes one or more central processing units (CPU) 410 connected via a bus 401 to several other peripherals. Such peripherals include an input device, such as a keyboard and/or mouse 420, a monitor 422 for displaying information, a network interface card 424 and/or a modem 426 that provide network connectivity and communication.

The application server 400 also includes internal data storage 430. This data storage 430 is non-volatile storage, such as one or more magnetic hard disk drives (HDDs) and/or one or more solid state drives (SSDs). The data storage 430 is used to store a variety of important files, documents, or other digital information, such as the operating system files, application files, user data, and/or temporary recording space.

The application server 400 also includes system memory 440. The system memory 440 is preferably faster and more efficient than the data storage 430, and is configured as random access memory (RAM) in an embodiment. The system memory 440 contains the runtime environment of the application server, storing temporary data for any of the operating system 442, java virtual machine 444, java application server 446, and communication control logic 448.

System Operation

Operations of communicating with an inmate by way of the ISB system 100 will be described with respect to FIG. 5. Although the physical devices and components that form the system have largely already been described, additional details regarding their more nuanced operation will be described below with respect to FIGS. 1-4. While FIG. 5 contains methods of operation of the ISB system 100, the operations are not limited to the order described below, and various operations can be performed in a different order. Further, two or more operations of each method can be performed simultaneously with each other.

The ISB system 100 provides communications between a variety of different devices. For starters, regardless of the communication type, all communications to/from an inmate communication device 120 are transported by way of the ISB center 210. The ISB center 210 includes a user interface such as a website, an IVR, or another interface which is managed by, or on behalf of, a correctional facility. The interface provides an interactive platform for users to communicate with outsiders. For example, the ISB center 210 can provide an interface via a website for video communications or the ISB center 210 can provide an interface via an IVR for audio communications. By providing an interface that is managed by way of the ISB center 210, a consistent interface is used by inmates and family and friends regardless of the correctional facility communication provider. Further, while the interface is provided by the ISB center 210 as a front end link, the interface's backend links are provided by the correctional facility communication provider 220. Accordingly, the correctional facility communication provider 220 provides all the services behind the scenes of the interface.

Communication Operation

A user, either an inmate or an outsider, wishing to initiate or transmit a private communication must first register and set up an account with the ISB system 100. The registry process requires the user to submit identity data, as previously described, to the ISB system 100 in order to verify the user's identity to a high degree of likelihood. Registration can be either in-person or by communication device (e.g., 120 or 130), depending on correction facility rules. This is particularly important for security purposes, to ensure that the ISB system 100 properly vets inmates and outsiders wishing to use the ISB system 100 and verify that inmates and outsiders are authorized to communicate with each other.

Once identity data has been submitted and verified, the identity data is stored in the ISB center 210. The data is used by the ISB system 100 to perform identity verifications, as previously described. In an embodiment, after identity data has been verified, the user setups up an account through the ISB system 100 such that the user can communicate by way of the ISB system 100 using different communication devices 120 or 130. An account setup process may include any one or more of setting a username and password, entering additional identifying information, or indicating preferences for communications.

Figure 5:
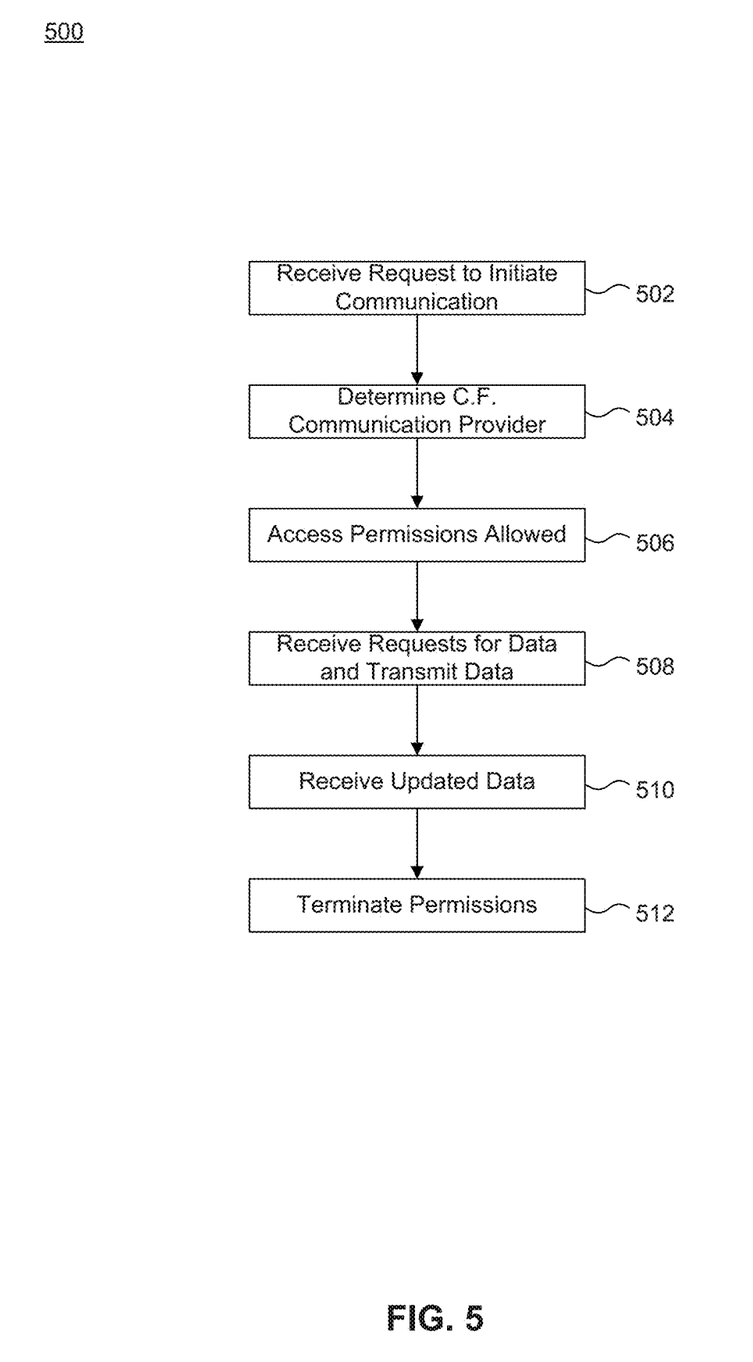
FIG. 5 illustrates a flowchart diagram of a method of routing a communication by way of the ISB system, according to exemplary embodiments of the present disclosure.

FIG. 5 illustrates a flowchart diagram of a method of routing a communication by way of the ISB system, according to exemplary embodiments of the present disclosure. Once registration is completed, a communication starts at 502, as shown by FIG. 5. The communication starts by either a signal being received by the ISB center 210 that an inmate or outsider is attempting to start a communication. Next, in 504, the ISB center 210 determines which of the correctional facility communication providers 221-223 to route and monitor the communication. The determination is based on the correctional facility where the inmate, whether initiating or receiving the communication, is incarcerated. For example, if an inmate initiates a communication, the ISB center 210 determines the inmate's correctional facility by determining an internet protocol (IP) address of the inmate communication device 120 used to initiate the communication. As another example, if an outsider is attempting to communicate with an inmate, the ISB center 210 determines the inmate's correctional facility by receiving information on an identity of the inmate to receive the communication and determining the correctional facility based on stored identity data associated with the inmate. Once the correctional facility is identified, the ISB center 210 identifies the correctional facility communication provider 220 by way of the database data which includes data indicating which correctional facility (140-144) correspond to which correctional facility communication provider (221-223).

In an embodiment, the determination of the correctional facility communication provider 220 to route and monitor the communication is further based on a type of communication being initiated. In this embodiment, at least one of the correctional facilities (140-144) uses a number of correctional facility communication providers (e.g. 221-223) for different communication types (e.g., audio, video, text). For example, the correctional facility 140 can have contracts with the correctional facility communication provider 221 for texting and video communications and with the correctional facility communication provider 222 for audio communications. Thus, the database data would include data indicating the association of correctional facility 140 with both the correctional facility communication provider 221, 222, and also the associated communication types. Accordingly, the ISB center 210 further determines the type of communication being initiated before determining the correctional facility communication provider 220 to route and monitor the communication.

In an embodiment, the determination of the correctional facility communication provider 220 to route and monitor the communication is further based on a selection received from user of a communication device 120 or 130 that is initiating the communication. In detail, the ISB center 210 provides data pertaining to correctional facility communication providers that are available to provide communication services. The data can also include cost of services and/or past quality of services such that the user is able to make an informed decision on selecting correctional facility communication provider.

In 506, the ISB center 210 transmits permissions to the determined correctional facility communication provider 220 to access data. The permissions allow the correctional facility communication provider 220 access to stored data related to the inmate and outsider involved in the communication such as identity data, communication data, communication logs, etc. needed to perform routing and monitoring of the communication.

In 508, the ISB center 210 receives requests for data and transmits data to the correctional facility communication provider 220. In an embodiment, the ISB center 210 performs security checks to verify that the purported correctional facility communication provider 220 is authorized to access data related to the inmate or outsider associated with the communication. These security checks may include verifying an IP address of the received request or receiving an access code from the correctional facility communication provider 220 associated with the correctional facility 140.

In 510, the ISB center 210 receives updated communication data from the correctional facility communication provider 220. The updated data includes at least one of a communication log, a communication, and/or monitored data associated with the communication. The ISB center 210 uses the updated data to update stored communication data related to the inmate and the outsider associated with the communication. In an embodiment, the ISB center 210 transmits a request to receive updated data to the correctional facility communication provider 220. In this embodiment, the request may indicate a communication and data format desired to be received by the ISB center 210 and/or a predetermined time or schedule for receiving the data from the correctional facility communication provider 220. By requesting that the data be received according to a predetermined time or schedule, the ISB center 210 schedules the flow of data to/from the ISB center 210, which can reduce bandwidth issues. Requests for updated data at predetermined time or schedule include, for example, requesting to receive the updated data transmitted at a specific date and time when bandwidth is available, requesting to receive the updated data in data segments throughout the communication, or requesting to receive all of the updated data at the end of the communication. In an embodiment, the ISB center 210 also performs additional security checks to verify that the purported correctional facility communication provider 220 is authorized to access data related to the inmate or outsider associated with the communication, as previously described.

In 512, the ISB center 210 terminates permissions for the correctional facility communication provider 220 to access data associated with the inmate and outsider involved in the communication. Termination of permissions may occur immediately after a signal from the correctional facility communication provider 220 is received indicating that the communication has ended or after a signal is received indicating that monitoring of the communication has ended.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 6:
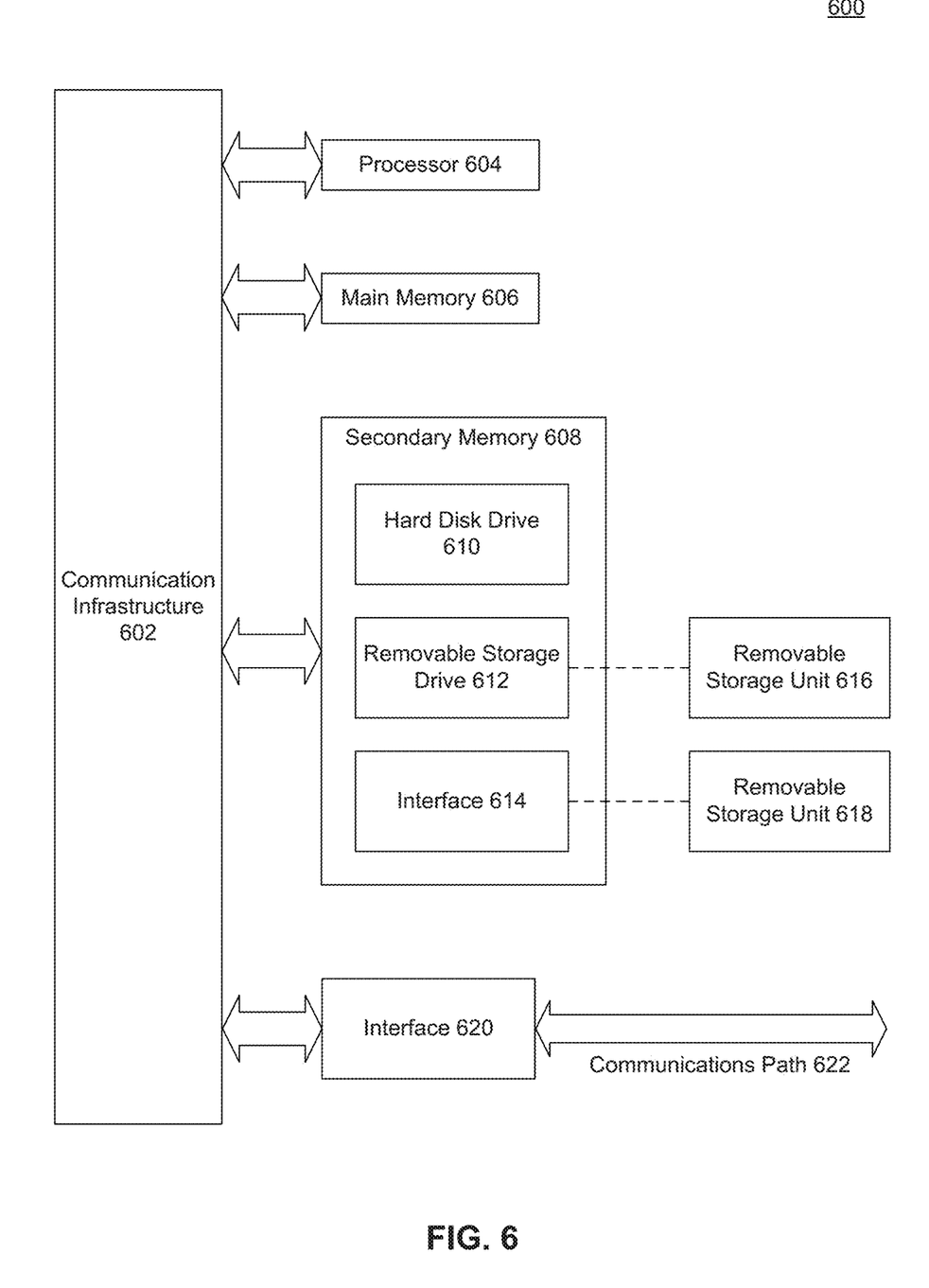
FIG. 6 illustrates a computer system, according to exemplary embodiments of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the method of FIG. 5 can be implemented in the environment of one or more computer systems or other processing systems. An example of such a computer system 600 is shown in FIG. 6. One or more of the modules depicted in the previous figures can be at least partially implemented on one or more distinct computer systems 600.

Computer system 600 includes one or more processors, such as processor 604. Processor 604 can be a special purpose or a general purpose digital signal processor. Processor 604 is connected to a communication infrastructure 602 (for example, a bus or network). Various software implementations are described in terms of this exemplary computer system. After reading this description, it will become apparent to a person skilled in the relevant art(s) how to implement the disclosure using other computer systems and/or computer architectures.

Computer system 600 also includes a main memory 606, preferably random access memory (RAM), and may also include a secondary memory 608. Secondary memory 608 may include, for example, a hard disk drive 610 and/or a removable storage drive 612, representing a floppy disk drive, a magnetic tape drive, an optical disk drive, or the like. Removable storage drive 612 reads from and/or writes to a removable storage unit 616 in a well-known manner. Removable storage unit 616 represents a floppy disk, magnetic tape, optical disk, or the like, which is read by and written to by removable storage drive 612. As will be appreciated by persons skilled in the relevant art(s), removable storage unit 616 includes a computer usable storage medium having stored therein computer software and/or data.

In alternative implementations, secondary memory 608 may include other similar means for allowing computer programs or other instructions to be loaded into computer system 600. Such means may include, for example, a removable storage unit 618 and an interface 614. Examples of such means may include a program cartridge and cartridge interface (such as that found in video game devices), a removable memory chip (such as an EPROM, or PROM) and associated socket, a thumb drive and USB port, and other removable storage units 618 and interfaces 614 which allow software and data to be transferred from removable storage unit 618 to computer system 600.

Computer system 600 may also include a communications interface 620. Communications interface 620 allows software and data to be transferred between computer system 600 and external devices. Examples of communications interface 620 may include a modem, a network interface (such as an Ethernet card), a communications port, a PCM-CIA slot and card, etc. Software and data transferred via communications interface 620 are in the form of signals which may be electronic, electromagnetic, optical, or other signals capable of being received by communications interface 620. These signals are provided to communications interface 620 via a communications path 622. Communications path 622 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 616 and 618 or a hard disk installed in hard disk drive 610. These computer program products are means for providing software to computer system 600.

Computer programs (also called computer control logic) are stored in main memory 606 and/or secondary memory 608. Computer programs may also be received via communications interface 620. Such computer programs, when executed, enable the computer system 600 to implement the present disclosure as discussed herein. In particular, the computer programs, when executed, enable processor 604 to implement the processes of the present disclosure, such as any of the methods described herein. Accordingly, such computer programs represent controllers of the computer system 600. Where the disclosure is implemented using software, the software may be stored in a computer program product and loaded into computer system 600 using removable storage drive 612, interface 614, or communications interface 620.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

Conclusion

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. An inmate communication system for correctional facilities, comprising:
   a first communication device configured for audio, video, or text communications, wherein the first communication device is associated with a first user and located at a correctional facility;
   a second communication device configured for audio, video, or text communications, wherein the second communication device is associated with a second user and located external to the correctional facility;
   a plurality of correctional facility communication providers configured to route communications between the first communication device and the second communication device by way of one or more service providers; and
   an intermediary service bureau (ISB) subsystem including a database, the ISB being configured to:

receive identity data of the first user from the first communication device;

register the first user for an account after verifying the identity data and storing the identity data in the database;

receive a request from the first communication device to initiate a first communication with the second communication device;

determine a selection of one of the plurality of correctional facility communication providers for routing the communications between the first and second communication devices, wherein the determination is based on at least one of a location of the correctional facility where the first communication device is located, a type of communication being initiated, or a selection received from the first user;

based on the determination, connect the first communication device to a selected correctional facility communication provider for routing the first communication between the first and second communication devices by way of the one or more service providers;

provide permissions to the selected correctional facility communication provider to retrieve communication logs and copies of communications between the first and second communication devices; and terminate the permissions after the communications between the first and second communication devices have ended.

2. The inmate communication system of claim 1, wherein the identity data comprises at least one of a username and password data, voice data, fingerprint data, retinal data, facial recognition data (2D or 3D), device data having a make and a model of the first communication device, and/or location data.

3. The inmate communication system of claim 1, wherein the verifying the identity data further comprises: verifying that the first user is authorized to communicate with users outside the correctional facility.

4. The inmate communication system of claim 1, wherein the registering the first user for the account comprises registering a username and a password for the first user and indicating preferences for the communications.

5. The inmate communication system of claim 1, wherein the ISB subsystem is further configured to determine the location of the correctional facility where the first communication device is located by determining an internet protocol (IP) address of the first communication device.

6. The inmate communication system of claim 1, wherein the selection received from the first user comprises the selected correctional facility communication provider chosen based on data regarding cost of services and past quality of services provided to the first user.

7. The inmate communication system of claim 1, wherein the type of communication being initiated comprises audio, video, or text.

8. An intermediary service bureau (ISB) system for correctional facilities, comprising:

a data storage device; and a plurality of subsystems comprising at least one processor configured to:

receive identity data of a first user from a first communication device located in a correctional facility;

register the first user for an account after verifying the identity data and storing the identity data in the data storage device;

receive a request from the first communication device to initiate a first communication with a second communication device, wherein the second communication device is associated with a second user and located external to the correctional facility;

determine a selection of one of a plurality of correctional facility communication providers for routing communications between the first and second communication devices by way of one or more service providers, wherein the determination is based on at least one of a location of the correctional facility where the first communication device is located, a type of communication being initiated, or a selection received from the first user;

based on the determination, connect the first communication device to a selected correctional facility communication provider for routing the first communication between the first and second communication devices by way of the one or more service providers;

provide permissions to the selected correctional facility communication provider to retrieve communication logs and copies of communications between the first and second communication devices; and terminate the permissions after the communications between the first and second communication devices have ended.

9. The ISB system of claim 8, wherein the at least one processor is further configured to determine the location of the correctional facility where the first communication device is located by determining an internet protocol (IP) address of the first communication device.

10. The ISB system of claim 8, wherein the type of communication being initiated comprises audio, video, or text.

11. The ISB system of claim 8, wherein the selection received from the first user comprises the selected correctional facility communication provider chosen based on data regarding cost of services and past quality of services provided to the first user.

12. The ISB system of claim 8, wherein the identity data comprises at least one of a username and password data, voice data, fingerprint data, retinal data, facial recognition data (2D or 3D), device data having a make and a model of the first communication device, and/or location data.

13. The ISB system of claim 8, wherein the verifying the identity data further comprises: verifying that the first user is authorized to communicate with users outside the correctional facility.

14. The ISB system of claim 8, wherein the registering the first user for the account comprises registering a username and a password for the first user and indicating preferences for the communications.

15. A method for routing inmate communications using an intermediary service bureau (ISB) system for correctional facilities, comprising:

receiving, by the ISB system, identity data of a first user from a first communication device located in a correctional facility;

registering the first user for an account with the ISB system after verifying the identity data and storing the identity data in a data storage device in the ISB system;

receiving a request from the first communication device to initiate a first communication with a second communication device, wherein the second communication device is associated with a second user and located external to the correctional facility;

determining, by at least one processor of the ISB system, a selection of one of a plurality of correctional facility communication providers for routing communications between the first and second communication devices by way of one or more service providers, wherein the determination is based on at least one of a location of the correctional facility where the first communication device is located, a type of communication being initiated, or a selection received from the first user;

based on the determination, connecting the first communication device to a selected correctional facility communication provider for routing the first communication between the first and second communication devices by way of the one or more service providers;

providing permissions to the selected correctional facility communication provider to retrieve communication logs and copies of communications between the first and second communication devices; and terminating the permissions after the communications between the first and second communication devices have ended.

16. The method of claim 15, further comprising:
determining the location of the correctional facility where the first communication device is located by determining an internet protocol (IP) address of the first communication device.

17. The method of claim 15, wherein the selection received from the first user comprises the selected correctional facility communication provider chosen based on data regarding cost of services and past quality of services provided to the first user.

18. The method of claim 15, wherein the identity data comprises at least one of a username and password data, voice data, fingerprint data, retinal data, facial recognition data (2D or 3D), device data having a make and a model of the first communication device, and/or location data.

19. The method of claim 15, wherein the verifying the identity data further comprises: verifying that the first user is authorized to communicate with users outside the correctional facility.

20. The method of claim 15, wherein the registering the first user for the account comprises registering a username and a password for the first user and indicating preferences for the communications.

* * * * *